(12) United States Patent
Skibbe

(10) Patent No.: US 8,996,243 B2
(45) Date of Patent: Mar. 31, 2015

(54) TRACK BRAKE WITH AT LEAST ONE VERTICALLY-MOVABLE BRAKING ELEMENT AND METHOD FOR DETERMINING THE RESPECTIVE POSITION THEREOF

(75) Inventor: Sven Skibbe, Adenbuettel (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/130,712

(22) PCT Filed: Jun. 14, 2012

(86) PCT No.: PCT/EP2012/061359
§ 371 (c)(1),
(2), (4) Date: Jan. 3, 2014

(87) PCT Pub. No.: WO2013/004468
PCT Pub. Date: Jan. 10, 2013

(65) Prior Publication Data
US 2014/0142804 A1    May 22, 2014

(30) Foreign Application Priority Data

Jul. 5, 2011   (DE) .......................... 10 2011 078 692

(51) Int. Cl.
*B61K 7/02* (2006.01)
*B60T 17/22* (2006.01)
*B61K 7/04* (2006.01)
*B61K 7/08* (2006.01)

(52) U.S. Cl.
CPC . *B61K 7/02* (2013.01); *B61K 7/025* (2013.01); *B61K 7/04* (2013.01); *B61K 7/08* (2013.01); *B60T 17/228* (2013.01)
USPC ............................... 701/34.4; 701/19; 701/20

(58) Field of Classification Search
CPC ............ B61K 7/02; B61K 7/08; B61K 7/025; B61K 7/04; B60T 17/228
USPC .......................................... 701/34.4, 19, 20
See application file for complete search history.

(56) References Cited

U.S. PATENT DOCUMENTS

| | | | |
|---|---|---|---|
| 1,635,989 A | 7/1927 | Froehlich | |
| 2006/0060434 A1* | 3/2006 | Bieker | 188/164 |

FOREIGN PATENT DOCUMENTS

| | | |
|---|---|---|
| DE | 551525 C | 6/1932 |
| DE | 3626390 A1 | 2/1988 |
| DE | 60310112 T2 | 6/2007 |

* cited by examiner

*Primary Examiner* — Mary Cheung
*Assistant Examiner* — Brian P Sweeney
(74) *Attorney, Agent, or Firm* — Laurence A. Greenberg; Werner H. Stemer; Ralph E. Locher

(57) ABSTRACT

A track brake includes at least one vertically movable, more particularly lowerable, braking element and an inclination sensor disposed in such a manner that a respective position of the at least one vertically movable braking element can be determined on the basis of at least one measurement value of the inclination sensor. A method for determining the position of at least one vertically movable, more particularly lowerable, braking element of a track brake is also provided.

17 Claims, 2 Drawing Sheets

US 8,996,243 B2

TRACK BRAKE WITH AT LEAST ONE VERTICALLY-MOVABLE BRAKING ELEMENT AND METHOD FOR DETERMINING THE RESPECTIVE POSITION THEREOF

BACKGROUND OF THE INVENTION

Field of the Invention

The invention relates to a track brake with at least one vertically-movable, more particularly lower able, braking element.

Track brakes involve mechanical braking devices which are used in gravity-type classification yards to control the speed of movement of the units in the form of individual freight cars or freight car groups. Depending on the respective embodiment of the system as well as the respective function of the track brake, different types of track brakes are used in such cases. Thus jaw-type brakes or jaw-type track brakes are especially able to be used as slope brakes and sorting siding brakes. These retard the passing freight cars by jaw-type brakes being pressed laterally against the car wheels. By contrast, gradient compensation brakes arranged in the sorting sidings are frequently embodied as very small brakes with piston-shaped elements, which are pressed downwards when a wheel of a rail vehicle passes over them and absorb energy through this process.

Regardless of the type of track brake in each case, it can be desirable or necessary for individual brake elements of the track brake to be embodied as vertically-movable, meaning in particular lower able or height-adjustable respectively. Depending on the respective form of embodiment of the track brake, on the one hand the brake element concerned or the track brake can be activated or deactivated by this process. On the other hand this offers the opportunity for example of lowering the at least one vertical brake element in order by this action to enable a drive vehicle to negotiate the track brake.

A track brake of the type mentioned at the start with at least one vertically-movable brake element is known for example from the German publication DE 36 26 390 A1. This describes a track brake in the form of a jaw-type brake with vertically-movable brake elements in the form of lowerable braking jaws. In this case the track brake, in a lowered end position of the braking jaw, is not only ineffective but also has no profile, so that vehicles can move past the brake, which could not or are not allowed to move past the track brake in a raised end position of the braking jaw because of the damage this might cause to the vehicle and/or to the track brake. To monitor the upper and the lower end position of the braking jaw the known track brake has a sensor, which is preferably embodied as an inductive proximity switch and which interacts with the at least one control rod which is mechanically connected to a braking jaw and has means for activating the sensor in the two end positions of the control rod.

BRIEF SUMMARY OF THE INVENTION

The underlying object of the present invention is to specify a track brake with at least one vertically-movable, in particular lower able braking element, which makes it possible to determine the respective position of the at least one vertically-movable braking element in a comparatively simple and at the same time especially reliable manner.

This object is achieved in accordance with the invention by a track brake with a least one vertically-movable, more particularly lowerable braking element, wherein the track brake has an inclination sensor which is disposed such that on the basis of at least one measured value of the inclination sensor, the respective position of the at least one vertically-movable braking element is able to be determined.

The inventive track brake is thus characterized in that it has an inclination sensor which, because of its arrangement, makes it possible for it to determine, on the basis of at least one measured value detected by it, the respective position of the at least one vertically-movable braking element. Within the context of the present invention an inclination sensor is understood in general terms to be a sensor device which is suitable for determining a measured value directly or indirectly specifying the vertical alignment of the at least one vertically-movable braking element. In this case such an inclination sensor can determine the vertical alignment in accordance with any given measurement principle known per se. Corresponding inclination sensors are for example known from the prior art and available comparatively cheaply on the market in the form of acceleration sensors embodied for measuring the effects of static accelerations, i.e. especially gravity or Earth. In this case the invention makes use of the fact that, with a track brake with a vertically-movable braking element, as a rule an inclination sensor can be arranged such that, on the basis of its measured values or its measured value, it is possible to obtain information about the respective position of the at least one vertically-movable braking element.

The inventive track brake has the advantage that an inclination sensor can be disposed in a comparatively simple manner on or in a component of the track brake, without expensive constructional measures being needed for this purpose. This reduces not only the outlay for manufacturing the track brake or implementing the monitoring system or determining its state respectively, i.e. the respective position of the at least one vertically-movable braking element, but in addition also increases the robustness or reliability of the track brake.

At this juncture it should be pointed out that the inventive track brake can of course also have a number of inclination sensors. In such cases for example, in the case of a number of vertically-movable braking elements, one inclination sensor can be provided in each case for determining or monitoring the respective position of one of the braking elements. Furthermore there is also the option of a number of inclination sensors being provided for further enhancing the reliability and fail safe operation even for an individual vertically-movable braking element.

The vertically-movable braking element can in particular involve a component of the track brake which, by contact with the wheels of moving units, withdraws energy from said units and thus breaks them. Thus with the vertically-movable braking element, in the case of a jaw-type brake, a lower able or height-adjustable brake bar can be involved and in the case of a gradient compensation brake a hydraulic brake or a piston-shaped element of such a brake can be involved for example. Basically it is possible here for the inclination sensor to be disposed directly on or in the respective vertically-movable braking element.

In accordance with an especially preferred development of the inventive track brake, the inclination sensor is disposed on or in a further element of the track brake differing from the at least one vertically-movable braking element. This is advantageous since an arrangement of the inclination sensor directly on or in the at least one vertically-movable braking element is frequently not possible in practice or is only possible with significant outlay. Thus on the one hand it is for example conceivable for an arrangement of the inclination sensor on or in the at least one vertically-movable braking element to be difficult or not possible for constructional reasons. On the other hand the reliability of the inclination sensor itself can be adversely affected in this case. By arranging the inclination sensor on or in a further element of the track brake differing from the at least one vertically-movable braking element it is thus advantageously possible, while taking account of the respective circumstances and conditions, to select an especially favorable installation location for the inclination sensor. The requirement for this is merely that the inclination sensor is disposed such that its measured value allows information to be provided about the respective position of the at least one vertically-movable braking element. This can be insured for example by the inclination sensor being arranged on or in a further element of the track brake which is mechanically connected to the vertically-movable braking element and changes its inclination as a function of the respective position of the at least one vertically-movable braking element.

Basically the inventive track brake can involve a track brake of any given type.

In accordance with an especially preferred embodiment of the inventive track brake, the track brake is a jaw-type brake. This is advantageous since jaw-type brakes are in widespread use in gravity type classification yards and frequently have vertically-movable braking elements in the form of braking jaws.

Preferably the inventive track brake can be developed in this case such that the inclination sensor is disposed on or in a spring package of the braking jaw. This is advantageous since the braking jaws of jaw-type brakes usually rest on elastic spring packages, which can be pre-tensioned using a brake control, so that different braking forces can be exerted on vehicle wheels passing through the jaw-type brake. Advantageously the spring packages of the jaw-type brakes are at a certain distance here from the rails or the rail cars or rail car groups passing by, so that the inclination sensor is comparatively protected against mechanical influences when disposed on or in a spring package of the jaw-type brake. In addition the spring packages, for constructional reasons, are usually mechanically linked to the vertically-movable braking elements of a jaw-type brake in the form of the braking jaws such that, from the inclination of the spring packages, i.e. on the basis of at least one measured value of an inclination sensor disposed on or in a spring package of the track brake bar, the respective position of the braking jaw or of the braking jaws is able to be determined.

In accordance with a further especially preferred embodiment of the inventive track brake, the track brake is a gradient compensation brake. This is advantageous since gradient compensation brakes, which can be embodied for example as what are referred to as screw-type track brakes or so-called Dowty retarders, are widely used in gravity-type classification yards for regulating speed in the sorting sidings. In such cases corresponding gradient compensation brakes usually have vertically-movable braking elements for their activation or deactivation or also to make it possible for driven vehicles to pass over them, in the form of hydraulic braking cylinders for example.

Preferably the inventive track brake can further be developed here such that the inclination sensor is disposed on or in a lowering device of the gradient compensation brake. This is advantageous since the inclination or position respectively of a lowering device of a gradient compensation brake, i.e. of an element, which is used for example for lowering the hydraulic brake cylinder, usually allows information to be provided about the respective position of the at least one vertically-movable braking element in the form of the hydraulic brake cylinder of the gradient compensation brake.

Preferably the inventive track brake can also be embodied such that the inclination sensor is embodied for transferring the at least one measured value to an evaluation device. This offers the advantage that the respective position of the at least one vertically-movable braking element does not have to be determined by the inclination sensor itself, but can be done by a component which may be completely separate. Advantageously a corresponding evaluation device can in such cases for example be a component of a control device of a classification yard system in the form of a gravity system.

The present invention further relates to a method for determining the respective position of at least one vertically-movable, more particularly lower able braking element of a track brake.

In respect of the method, the underlying object of the present invention is to specify a comparatively simple-to-implement and at the same time especially reliable method for determining the respective position of at least one vertically-movable, especially lowerable, braking element of a track brake.

This object is inventively achieved by a method for determining the respective position of the at least one vertically-movable, especially lowerable, braking element of a track brake, wherein at least one measured value is detected by an inclination sensor and from the at least one measured value the respective position of the at least one vertically-movable braking element is determined.

The advantages of the inventive method correspond to those of the inventive track brake, so that in this regard the reader is referred to the corresponding information provided for said brake. The same applies in respect of the preferred embodiments of the inventive method described below in respect of the corresponding preferred developments of the inventive track brake, so that the reader is also referred in this regard to the corresponding explanations given above.

Preferably the inventive method can execute such that the measured value is detected by an inclination sensor disposed on or in a further element of the track brake differing from the at least one vertically-movable braking element.

In accordance with a further especially preferred embodiment of the inventive method, the respective position of at least one vertically-movable element of a track brake in the form of a jaw-type brake is determined.

Preferably the inventive method here is further embodied such that the at least one measured value is detected by an inclination sensor disposed on or in a spring package of the jaw-type brake.

In accordance with an especially preferred development of the inventive method, the respective position of at least one vertically-movable element of a track brake in the form of a gradient compensation brake is determined.

Preferably the inventive method can further be characterized here such that the at least one measured value is detected by an inclination sensor disposed on or in a lowering device of the gradient compensation brake.

Preferably the inventive method is developed such that the least one measured value is transferred to an evaluation device.

In accordance with a further especially preferred embodiment of the inventive method a signal identifying the respective position of the at least one vertically-movable element of the track brake is transferred from the evaluation device to a monitoring device. It is conceivable here for example for the evaluation device to be embodied as an element of the inclination sensor or of the track brake and for the monitoring device to be a component of a control device of the classification yard system.

BRIEF DESCRIPTION OF THE SEVERAL VIEWS OF THE DRAWING

The invention is explained below on the basis of exemplary embodiments. In the figures

DESCRIPTION OF THE INVENTION

Figure 1:
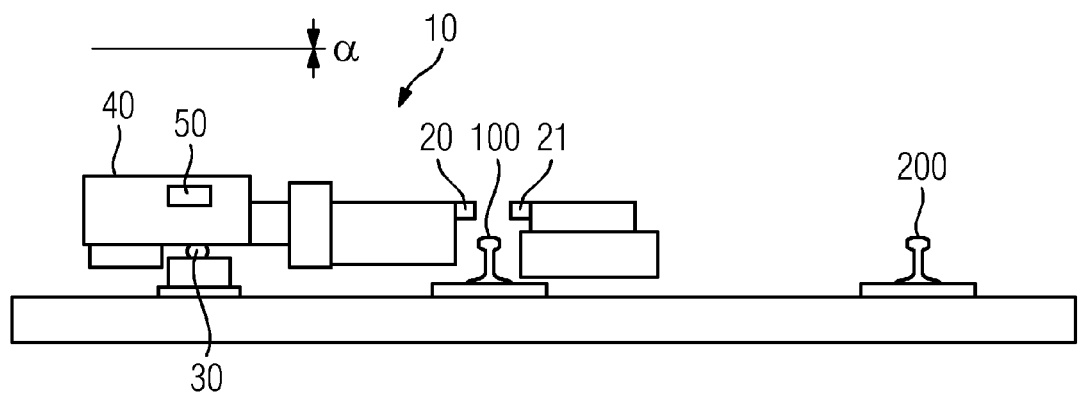
FIG. 1 shows, in an outline schematic, a first exemplary embodiment of the inventive track brake in the form of a jaw-type brake in an active state.
Figure 2:
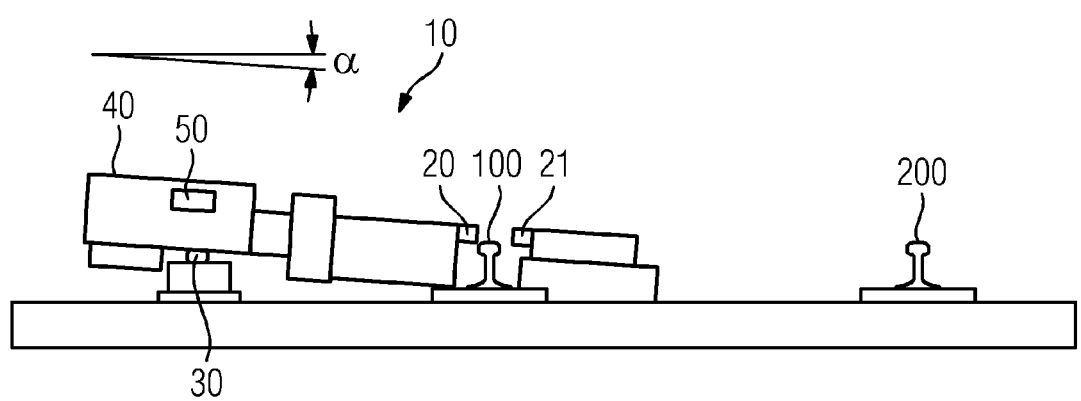
FIG. 2 shows, in an outline schematic, the track brake in accordance with the exemplary embodiment of FIG. 1 in an inactive state.
Figure 3:
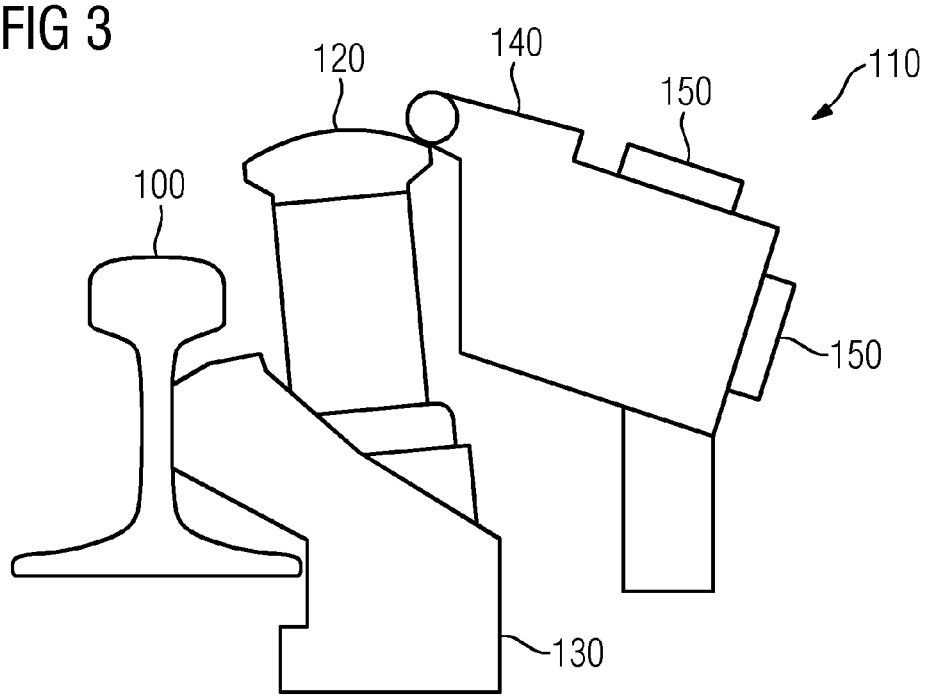
FIG. 3 shows, in an outline schematic, a second exemplary embodiment of the inventive track brake in the form of a gradient compensation brake in an active state
Figure 4:
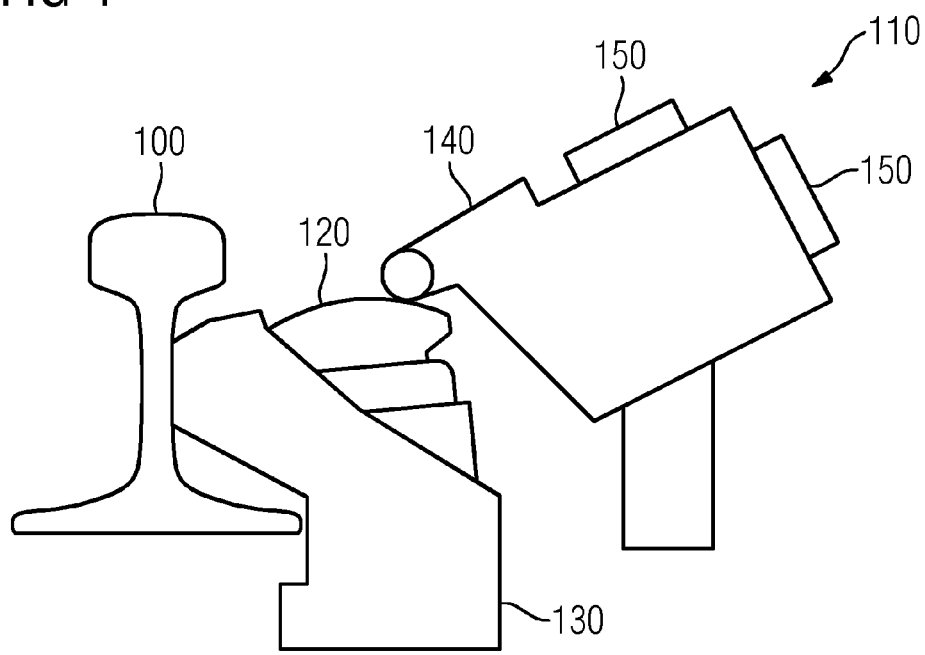
FIG. 4 shows, in an outline schematic, the track brake in accordance with the exemplary embodiment of FIG. 3 in an inactive state.

In FIGS. 1 and 2 and in FIGS. 3 and 4 for reasons of clarity, identical components are identified by the same reference characters in each case.

FIG. 1 show, in an outline schematic, a first exemplary embodiment of the inventive track brake in the form of a jaw-type brake in an active state. The figure shows a jaw-type brake 10, having an outer braking jaw 20 and also an inner braking jaw 21, which are disposed in the area of a rail 100 such that the wheels of the cars or car groups passing the jaw-type brake 10 can be braked by interaction with the braking jaws 20, 21.

It should be pointed out that in FIG. 1, for reasons of clarity; only a single-sided jaw-type brake 10 is shown. Regardless of this the jaw-type brake 10 could naturally also be designed as a two-sided jaw-type brake, in which case a corresponding braking device would also be provided for the second rail 200.

Accordingly, in the diagram of FIG. 1, the jaw-type brake 10 also has a pivot point 30 on which the spring package 40 is supported. By means of the spring package 40 it is possible here to apply a controllable pressure force to the braking jaw 20, 21 and thus control the braking force acting on the wheels.

In order to create the greatest possible braking power it is expedient, for braking passing wheels, for the braking jaw 20, 21 to engage as high as possible on the wheels. This leads to it not being possible for a drive vehicle, in the form of a classification locomotive for example, to pass the jaw-type brake 10 in the active state of the jaw-type break shown in FIG. 1. To avoid corresponding operational restrictions, with at the same time the best possible engagement point of the braking jaws 20, 21, the braking jaws 20, 21 of the jaw-type brake 10 are embodied as vertically-movable braking elements such that they are rotatably supported via the pivot point 30. In the active state shown in FIG. 1, i.e. in the event of the braking jaws 20, 21 assuming an upper end position, the braking jaws 20, 21 make an angle with the horizontal of $\alpha=0°$.

In order to make possible a reliable and at the same time comparatively simple-to-implement determination or monitoring of the respective position of the vertically-movable braking elements in the form of the braking jaws 20, 21, the track brake 10 in accordance with the exemplary embodiment of FIG. 1 also has an inclination sensor 50. This allows the angle of inclination $\alpha$ to be determined by means of known methods. In addition the inclination sensor 50 can also be embodied as an inclination switch, which triggers a switching action as a function of the respective angle of inclination, i.e. if the angle exceeds or falls below a predetermined angle of inclination.

In accordance with the diagram shown in FIG. 1, the inclination sensor 50 is not disposed directly on the braking jaws 20, 21, but on the spring package 40. This offers the advantage that an adverse effect on the function of the braking jaws 20, 21 is avoided and at the same time the inclination sensor 50 is protected from mechanical stresses or damage by wheels of rail vehicles rolling past it.

FIG. 2 shows, in an outline schematic, the track brake in accordance with the exemplary embodiment of FIG. 1 in an inactive state. This means that the jaw-type brake 10 in FIG. 2, by contrast with FIG. 1, is shown with the braking jaws 20, 21 lowered. In accordance with the diagram shown in FIG. 2, the braking jaws 20, 21, starting from the diagram shown in FIG. 1, have been moved for this purpose by a rotation around the pivot point 30 into a lowered position. Furthermore the jaw-type brake 10 in the diagram shown in FIG. 2 is fully opened, so that the gap between the braking jaws 20, 21 is enlarged by comparison with FIG. 1.

In accordance with the diagram depicted in FIG. 2, the braking jaws 20, 21 and also the spring package 40, in the situation shown, have an angle of inclination $\alpha$ of around 3.5°. On the basis of a corresponding measured value of the inclination sensor 50, it is thus possible to determine that the vertically-movable braking elements in the form of the braking jaws 20, 21 are in their lowered position, i.e. in their lower end. Thus a reliable determination of the respective position of the braking jaws 20, 21 is made possible by means of the inclination sensor 50 in a manner requiring comparatively little effort.

The respective position of the braking jaws 20, 21 can on the one hand be determined by the inclination sensor 50 itself. Where the inclination sensor 50 is embodied as an inclination switch, said switch can for example be designed so that a switching action is triggered as from an angle of inclination of 3°, in order to signal that the lower end position has been reached.

On the other hand the option also exists of the inclination sensor being embodied to transfer the at least one measured value to an evaluation device. In this case a corresponding evaluation device can be embodied either as an element of the track brake in the form of the jaw-type brake 10 or as a component spatially separated from said brake, such as in the form of a component of a control device of the gravity classification system, to which the jaw-type brake 10 belongs. Depending on the respective circumstances there can be either a wired also a wireless transmission of the at least one measured value from the inclination sensor 50 to the evaluation device in such cases.

FIG. 3 shows, in an outline schematic, a second exemplary embodiment of the inventive track brake in the form of a gradient compensation brake 110 in an active state. The gradient compensation brake 110 has a hydraulic brake or a hydraulic brake cylinder 120 respectively, which is connected via an attachment 130 to a rail 100.

In accordance with the diagram depicted in FIG. 3, the gradient compensation brake 110 also has a lowering device 140, by means of which the hydraulic brake 120 is able to be moved from the position depicted in FIG. 3, in which the gradient compensation brake 110 is active, into a lowered position or position of the hydraulic brake 120, in which the gradient compensation brake 110 is inactive.

In order to now be able to reliably determine and monitor the position of the vertically-movable braking element in the form of the hydraulic brake 120 in operation of the gradient compensation brake 110, the gradient compensation brake 110 has at least one inclination sensor 150. This can be provided on the lowering device 140 for example, which because of a change in its inclination as a function of the respective position of the hydraulic brake 120 allows information about the respective position of the hydraulic brake 120. As indicated in FIG. 3, different locations are conceivable here at which the inclination sensor 150 can be disposed as an alternative. In addition it is also conceivable for one inclination sensor 150 to be provided at both of the positions shown in FIG. 3 and for these, independently of one another, in order to enhance the failsafe operation and the redundancy of the gradient compensation brake 110, to detect measured values and supply them to an evaluation and/or a monitoring device.

FIG. 4 shows, in an outline schematic, the track brake in accordance with the exemplary embodiment of FIG. 3 in an inactive state. By comparison with FIG. 3, it is clear here that the hydraulic brake 120 in FIG. 4 is lowered into a position or end position such that wheels of rail vehicles rolling past pass the gradient compensation brake 110 without interacting with it. In accordance with the diagram depicted in FIG. 4, the inclination sensor 150 or the number of inclination sensors 150, because of the associated change in the inclination of the lowering device 140 from the determined inclination, allow the respective position of the vertically-movable braking element in the form of the hydraulic brake 120 to be determined from the inclination determined.

In accordance with the information given in this document the described exemplary embodiments of the inventive track brake and also the inventive method have the particular advantage that, by means of the inclination sensor 50 or 150, a reliable determination of the respective position of the respective at least one vertically-movable braking element and thus also of the operating state of the relevant track brake is possible without expensive additional constructional measures.

The invention claimed is:

1. A track brake, comprising:
   at least one vertically-movable braking element; and
   an inclination sensor providing at least one measured value, said inclination sensor disposed and configured to determine a respective position of said at least one vertically-movable braking element based on said at least one measured value.

2. The track brake according to claim 1, wherein said vertically-movable braking element is lowerable.

3. The track brake according to claim 1, which further comprises a further element differing from said at least one vertically-movable braking element, said inclination sensor disposed on or in said further element.

4. The track brake according to claim 1, wherein the track brake is a jaw-type brake.

5. The track brake according to claim 4, which further comprises a spring package, said inclination sensor disposed on or in said spring package.

6. The track brake according to claim 1, wherein the track brake is a gradient compensation brake.

7. The track brake according to claim 6, which further comprises a lowering device, said inclination sensor disposed on or in said lowering device.

8. The track brake according to claim 1, wherein said inclination sensor is configured to transfer the at least one measured value to an evaluation device.

9. A method for determining a respective position of at least one vertically-movable braking element of a track brake, the method comprising the following steps:
   detecting at least one measured value using an inclination sensor; and
   determining the respective position of the at least one vertically-movable braking element of the track brake from the at least one measured value.

10. The method according to claim 9, wherein the at least one vertically-movable braking element is lowerable.

11. The method according to claim 9, which further comprises:
    providing a further element of the track brake differing from the at least one vertically-movable braking element; and
    placing the inclination sensor for detecting the at least one measured value on or in the further element.

12. The method according to claim 9, which further comprises determining a respective position of a jaw-type brake as the at least one vertically-movable element.

13. The method according to claim 12, which further comprises providing a spring package of the jaw-type brake, and placing the inclination sensor for detecting the at least one measured value on or in the spring package.

14. The method according to claim 9, which further comprises determining a respective position of a gradient compensation brake as the at least one vertically-movable element of the track brake.

15. The method according to claim 14, which further comprises providing a lowering device of the gradient compensation brake, and placing the inclination sensor for detecting the at least one measured value on or in the lowering device.

16. The method according to claim 9, which further comprises transferring the at least one measured value to an evaluation device.

17. The method according to claim 16, which further comprises transferring a signal identifying the respective position of the at least one vertically-movable element of the track brake from the evaluation device to a monitoring device.

* * * * *